(12) United States Patent
Kikuchi

(10) Patent No.: US 10,310,105 B2
(45) Date of Patent: Jun. 4, 2019

(54) RADIATION IMAGE CAPTURING APPARATUS AND RADIATION IMAGE CAPTURING SYSTEM

(71) Applicant: KONICA MINOLTA, INC., Chiyoda-ku, Tokyo (JP)

(72) Inventor: Ryouhei Kikuchi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/960,823

(22) Filed: Apr. 24, 2018

(65) Prior Publication Data
US 2018/0341030 A1   Nov. 29, 2018

(30) Foreign Application Priority Data
May 24, 2017   (JP) ................................ 2017-102548

(51) Int. Cl.
*H04N 5/32* (2006.01)
*G01T 1/208* (2006.01)

(52) U.S. Cl.
CPC ............... *G01T 1/208* (2013.01); *H04N 5/32* (2013.01)

(58) Field of Classification Search
CPC .......... H04N 5/32; H04N 5/232; H04N 5/361; H05G 1/64

USPC .................................................... 250/370.09
See application file for complete search history.

(56) References Cited

U.S. PATENT DOCUMENTS

| 8,637,832 B2 * | 1/2014 | Watanabe | ............... G01T 1/247 |
| | | | 250/394 |
| 8,953,744 B2 * | 2/2015 | Watanabe | ............... H04N 5/32 |
| | | | 250/370.09 |

FOREIGN PATENT DOCUMENTS

JP   5985580 B2   9/2016

* cited by examiner

*Primary Examiner* — David P Porta
*Assistant Examiner* — Meenakshi S Sahu
(74) *Attorney, Agent, or Firm* — Holtz, Holtz & Volek PC

(57) ABSTRACT

A radiation image capturing apparatus includes a plurality of radiation detecting elements; a switch element; a scanning line; a signal line; a bias line; a hardware processor; and a reader which reads image data based on detection of irradiation, the image data based on an amount of charge accumulated in the plurality of radiation detecting elements. The hardware processor samples a signal a plurality of times, the signal based on a current of at least one of the currents flowing in the signal line, the bias line, the scanning line, and the detector line within a predetermined term and the hardware processor obtains a digital signal. The hardware processor calculates the obtained digital signal. The hardware processor determines whether the radiation image capturing apparatus is under a disturbance environment based on a result of calculation.

20 Claims, 11 Drawing Sheets

FIG.6
ORIGINAL DATA A 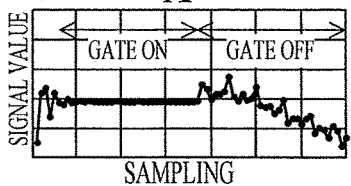 B 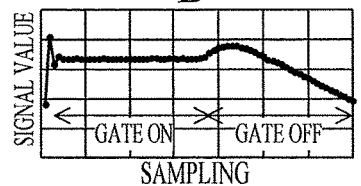 C 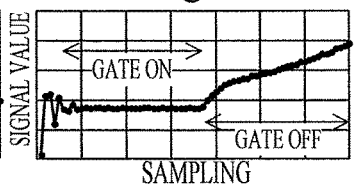
OFFSET DIFFERENCE D 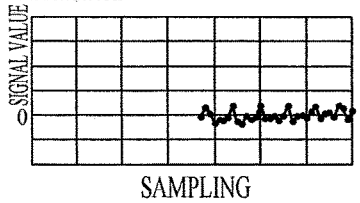 E 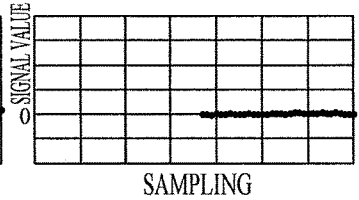 F 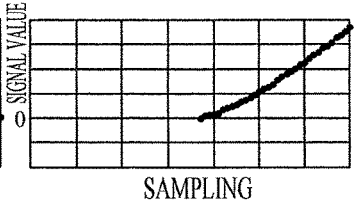
ABSOLUTE VALUE G 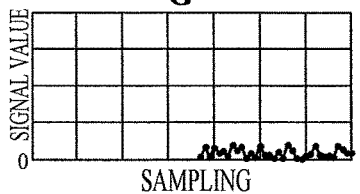 H 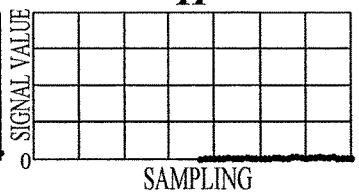 I 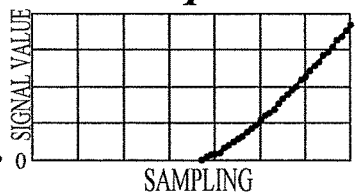
ABSOLUTE VALUE ACCUMULATION J 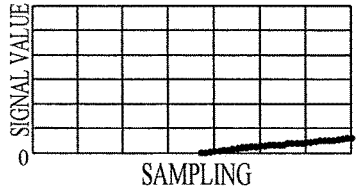 K 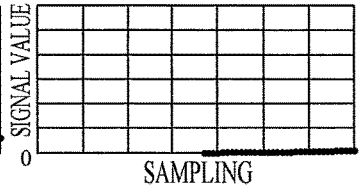 L 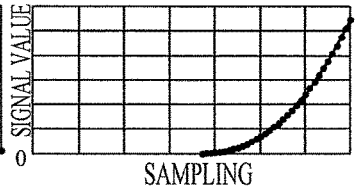
SIGN ADDED ACCUMULATION M 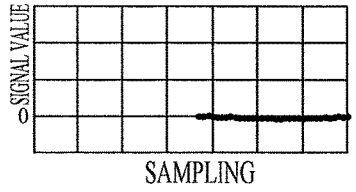 N 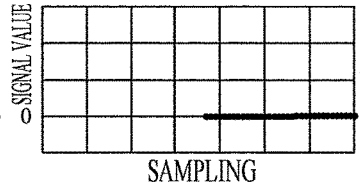 O 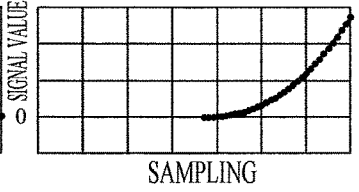
ABSOLUTE VALUE ACCUMULATION - SIGN ADDED ACCUMULATION P 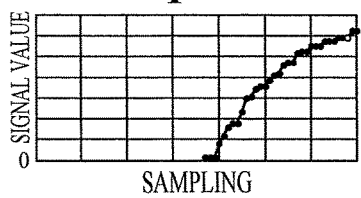 Q 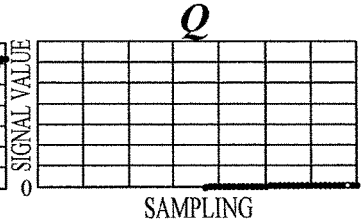 R 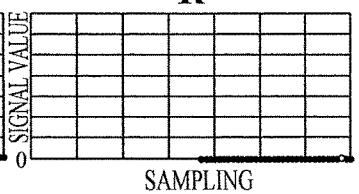

RADIATION IMAGE CAPTURING APPARATUS AND RADIATION IMAGE CAPTURING SYSTEM

BACKGROUND

1. Technological Field

The present invention relates to a radiation image capturing apparatus and a radiation image capturing system provided with the radiation image capturing apparatus.

2. Description of the Related Art

Typically, a radiation image capturing system includes a radiation irradiating apparatus which generates radiation, a radiation image capturing apparatus which generates image data of a radiation image by receiving radiation, a console which is used for setting the above or which displays a radiation image, and the like.

Conventionally, the radiation image capturing apparatus is mainly a dedicated (fixed) type formed as one with a capturing stage. Lately, a portable (cassette) type radiation image capturing apparatus has been developed and has been put into use. Such apparatus can be separated from the capturing stage and can be transported. Such radiation image capturing apparatus has a panel shape and may be called a FPD (Flat Panel Detector).

When the radiation image capturing apparatus is portable, the manufacturer of the radiation irradiating apparatus and the radiation image capturing apparatus is not always the same. In such case, the communication method between the apparatuses may be different and the signals cannot be exchanged. As a result, there were many cases where the radiation image capturing system could not be established.

In order to be applicable to many radiation irradiating apparatuses, a non-linking radiation image capturing apparatus is being developed so as to be able to detect that the radiation is emitted by itself even if there is no signal from the radiation irradiating apparatus.

Lately, there is a new problem with non-linking radiation image capturing apparatuses. That is, the surrounding disturbance environment (for example, electromagnetic wave, etc.) may be erroneously detected as the radiation being irradiated. Such erroneous detection causes a difference in the timing between the irradiation of radiation and the operation of the radiation image capturing apparatus. As a result, the necessary radiation image cannot be obtained and recapturing becomes necessary.

In order to prevent such situation, lately, there is a technique to detect irradiation of radiation based on the electric signal output from the radiation detecting unit, and then determining whether the detection is an error or not based on the polarity of the charge in response to the electric signal and at least one of the change in time of the amplitude of the waveform showing the change of the charge over time (Japanese Patent No. 5985580).

The conventional radiation image capturing apparatus as described in Japanese Patent No. 5985580 does not determine whether there is an error in detection until after it is determined that the radiation is detected. Therefore, there is the problem that time is necessary to determine whether there is an error in detection.

The radiation image capturing apparatus as described in Japanese Patent No. 5985580 cannot determine the difference between the radiation and the electromagnetic wave with the first detection term that detects the radiation and returns to the detection term when it is later determined that the detection is an error (electromagnetic wave). If used in an environment exposed to a large electromagnetic wave, the erroneous detection of radiation may be repeated and the capturing cannot be performed. In addition to not being able to perform capturing, the radiation may be irradiated erroneously while capturing cannot be performed.

SUMMARY

The present invention is conceived in view of the above problems, and an object of the present invention is to enable a non-linking type radiation image capturing apparatus which detects the irradiation of radiation by itself to determine that the apparatus is under a disturbance environment before erroneously detecting disturbance as radiation.

To achieve at least one of the abovementioned objects, according to an aspect of the present invention, a radiation image capturing apparatus reflecting one aspect of the present invention is described, the apparatus including, a plurality of radiation detecting elements which are positioned two-dimensionally; a switch element which holds charge in the radiation detecting elements; a scanning line which drives the switch element; a signal line which is connected through the switch element; a bias line which is connected to the radiation detecting elements; a hardware processor which detects that radiation is irradiated; and a reader which reads image data based on detection of irradiation of radiation by the hardware processor, the image data based on an amount of charge accumulated in the plurality of radiation detecting elements, wherein, the hardware processor samples a signal a plurality of times, the signal based on a current of at least one of the currents flowing in the signal line, the bias line, the scanning line, and the detector line within a predetermined term and the hardware processor obtains a digital signal, the hardware processor calculates the obtained digital signal, and the hardware processor determines whether the radiation image capturing apparatus is under a disturbance environment based on a result of calculation.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is a graph of data showing temporal change of the sampled signal value and a graph showing processed data generated by the radiation image capturing apparatus from the above data.

DETAILED DESCRIPTION OF EMBODIMENTS

Hereinafter, one or more embodiments of the present invention will be described with reference to the drawings. However, the scope of the invention is not limited to the disclosed embodiments.

<Configuration of Radiation Image Capturing Apparatus>

Figure 1:
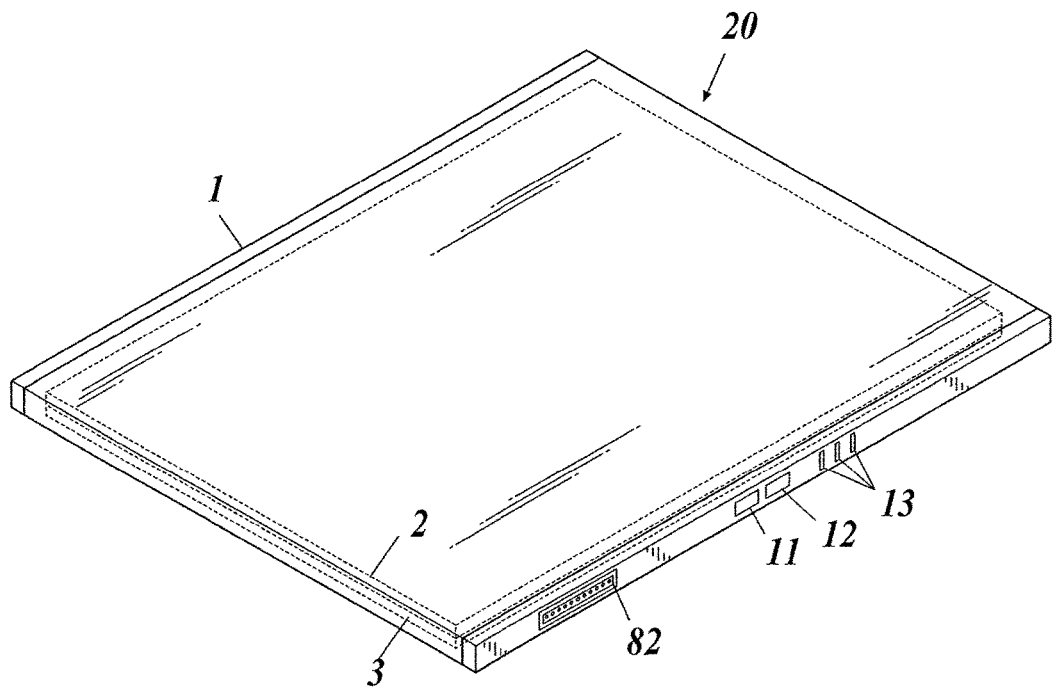
FIG. 1 is a diagonal view showing an outer appearance of a radiation image capturing apparatus according to an embodiment of the present invention.

The specific configuration of a radiation image capturing apparatus 20 according to an embodiment of the present invention is described. FIG. 1 is a diagonal view showing the radiation image capturing apparatus 20, FIG. 2 is a front view showing a radiation detector 3 provided in the radiation image capturing apparatus 20, FIG. 3 is a block diagram showing a schematic circuit configuration of the radiation image capturing apparatus 20, FIG. 4 is a timing chart showing an operation of the radiation image capturing apparatus 20.

An indirect type radiation image capturing apparatus is described here, and the apparatus obtains an electric signal by converting the emitted radiation to electromagnetic waves with different wavelengths such as visible light. The present invention can be applied to a direction radiation image capturing apparatus in which the radiation is directly converted to the electric signal in the detecting element.

Figure 2:
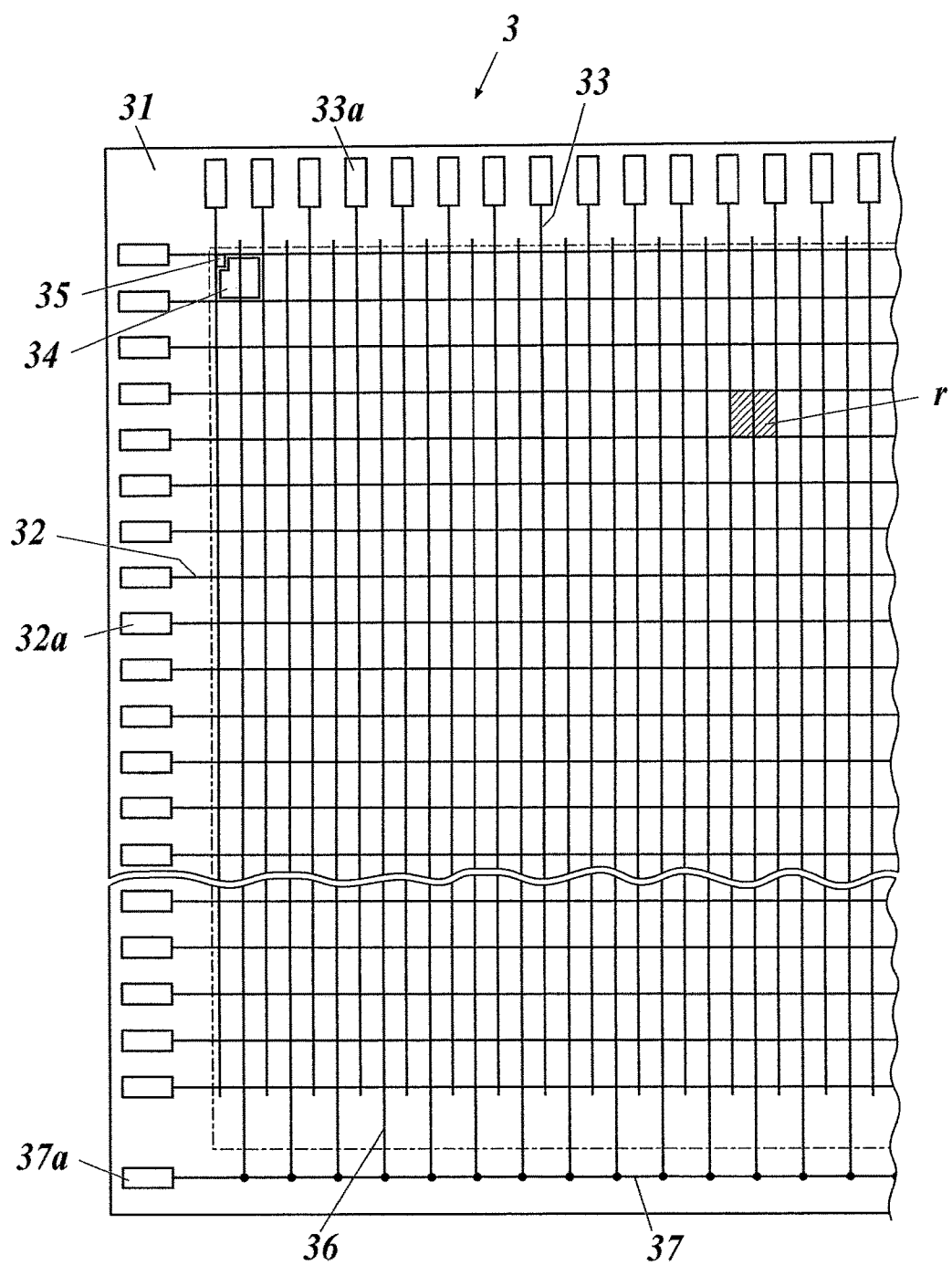
FIG. 2 is a planar view showing a radiation detector included in the radiation image capturing apparatus shown in FIG. 1.
Figure 3:
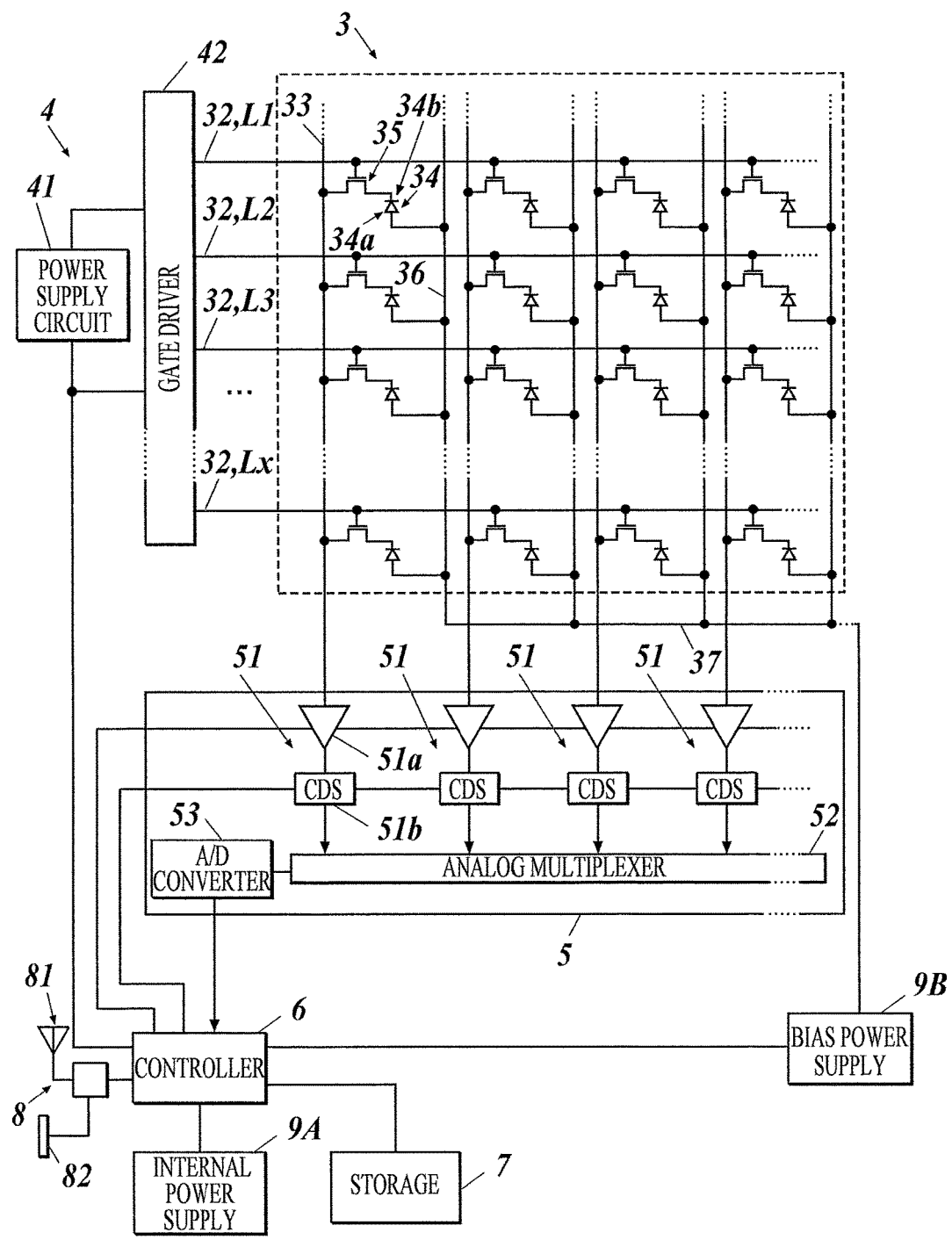
FIG. 3 is a block diagram showing a schematic circuit configuration of the radiation image capturing apparatus shown in FIG. 1.
Figure 4:
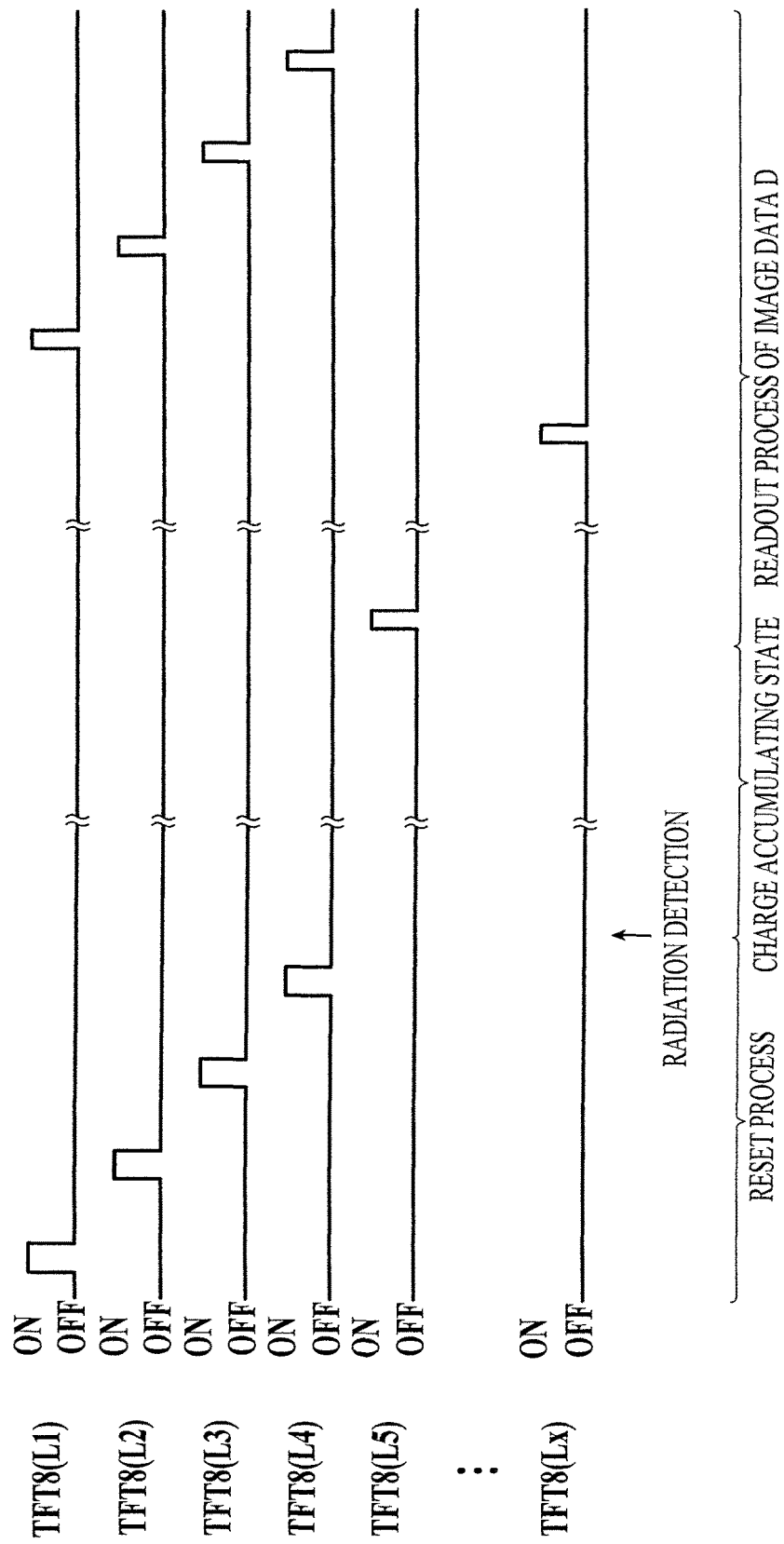
FIG. 4 is a timing chart showing an operation of the radiation image capturing apparatus shown in FIG. 1.

As shown in FIG. 1 to FIG. 3, the radiation image capturing apparatus 20 according to the present embodiment includes a case 1, and the following units which are stored in the case 1, a scintillator 2, a radiation detector 3, a scanning driver 4, a reader 5, a controller 6, a storage 7, a communicator 8, an internal power supply 9A, and the like.

On one side of the case 1, as shown in FIG. 1, a power supply switch 11, a switching switch 12, an indicator 13, a connector 82 and the like are provided.

The scintillator 2 is formed in a plate shape and when the scintillator 2 receives radiation, the scintillator 2 emits an electromagnetic wave with a longer wavelength than the radiation such as visible light to the radiation detector 3.

As shown in FIG. 2, the radiation detector 3 includes a substrate 31, a plurality of scanning lines 32, a plurality of signal lines 33, a plurality of radiation detecting elements 34, a plurality of TFTs 35 (switch element), a plurality of bias lines 36, and a connecting line 37.

The substrate 31 is formed in a plate shape using glass, base film, silicon, and other semiconductor material, and is positioned parallel to the scintillator.

The plurality of radiation detecting elements 34 are provided two dimensionally on the substrate 31.

One terminal of the radiation detecting element 34 is connected to a drain terminal of the TFT 35 which is a switch element, and the other terminal of the radiation detecting element 34 is connected to the bias line.

The plurality of scanning lines 32 are positioned connected to the gate terminal of the plurality of TFTs 35.

The signal lines 33 are provided orthogonal to the scanning lines 32, and the signal lines 33 are positioned connected to the source terminal of the TFTs 35.

Terminals 32a and 33a are formed on each end of the scanning lines 32 and the signals lines 33, respectively, and the lines can be pulled out from the substrate 31.

The plurality of bias lines 36 are connected with the connecting line 37, and a terminal 37a is similarly formed.

The bias lines 36 of the present embodiment are connected to the connecting line 37. Each bias line can be connected to the terminal 37a, or a set of a predetermined number of bias lines can be connected to the connecting line 37, and a plurality of terminals 37a can be provided. When connected with the connecting line 37, the electric current flowing in the bias lines 36 is concentrated, and the decrease in the voltage due to line resistance may become large. By division, the decrease in voltage can be prevented.

In order to prevent influence of line resistance, the bias lines 36 can be provided so that the entire surface is in a surface shape, or in a double cross shape in which the wires provided vertically and horizontally are connected in the crossing portions.

The radiation detecting element 34 generates an electric signal (electric current, charge) according to a dose of the radiation irradiated to the radiation detecting element (or light amount of the electromagnetic wave converted in the scintillator 2), and includes, for example, a photodiode, a phototransistor, and the like. Alternatively, a CCD format with a different configuration may be employed.

The radiation detecting elements 34 are provided in each of a plurality of regions r (pixels) divided by the plurality of scanning lines 32 and the plurality of signal lines 33. That is, the radiation detecting elements 34 according to the present embodiment are arranged in a two-dimensional shape (matrix shape). The radiation detecting elements 34 of the radiation detector 3 stored in the case 1 face the scintillator 2.

The TFT 35 maintains charge in the radiation detecting element (equivalent capacitance of radiation detecting element 34 and capacitance connected parallel to the radiation detecting element 34), and is provided in the plurality of regions r similar to the radiation detecting element 34. According to each TFT 35, the gate electrode is connected to the nearby scanning line 32, the source electrode is connected to the nearby signal line 33, and the drain electrode is connected to the radiation detecting element 34 in the same region r. Therefore, the radiation detecting element 34 are indirectly connected to the scanning line 32 and the signal line 33.

Alternatively, in some among the plurality of regions r, the radiation detecting element 34 and the signal line 33 can be connected by a line and the TFT 35 does not have to be provided.

The source and the drain of the TFT 35 have the same function and may be reversed.

The plurality of bias lines 36 are provided between the signal lines 33 so as to be parallel to the signal lines 33 and so as not to conduct with the crossing scanning lines 32.

The connecting line 37 is provided to extend parallel to the scanning lines 32 at the edge of the substrate 31. The connecting line 37 is connected to the plurality of bias lines 36. A terminal 37a is formed at the edge of the connecting line 37.

As shown in FIG. 3, the scanning driver 4 includes a power supply circuit 41, a gate driver 42, and the like.

The power supply circuit 41 generates the on voltage and the off voltage each with different voltages and supplies the above to the gate driver 42.

The gate driver 42 successively switches the voltage applied to each line L1 to Lx in the scanning lines 32 between on voltage and off voltage.

The reader 5 includes a plurality of reading circuits 51, an analog multiplexer 52, and an A/D converter 53.

The reading circuits 51 are each connected to the signal lines 33.

The reading circuits 51 include an integrating circuit 51a, a correlated double sampling circuit (hereinafter, CDS circuit) 51b, etc.

The integrating circuit 51a integrates charge discharged to the signal line 33 and outputs the voltage value according to the integrated charge amount to the CDS circuit 51b.

Before applying the on voltage (while applying the off voltage) to the scanning line 32 connected to the radiation detecting element 34 as the target from which the signal is read, the CDS circuit 51b samples and holds the output voltage of the integrating circuit 51a, applies the on voltage to the designated scanning line 32 to read the signal charge of the radiation detecting element, and outputs the difference of the output voltage of the integrating circuit 51a after the off voltage is applied to the designated scanning line 32.

The output voltage of the integrating circuit 51a after reading the signal charge can be sampled and held and the difference can be obtained.

The analog multiplexer 52 outputs the plurality of difference signals output from the CDS circuit 51b one at a time to the A/D converter 53. When one pixel from a plurality of pixels is generated (for example, one pixel averaging four pixels), two or more of the input plurality of difference signals can be output to the A/D converter 53.

The A/D converter 53 sequentially converts the input image data with the analog voltage value to image data with the digital value. Other than a configuration using the analog multiplexer 52, the A/D converter can be used for each CDS circuit.

The controller 6 includes a computer including components (not illustrated) such as a CPU (Central Processing Unit), a ROM (Read Only Memory), a RAM (Random Access Memory), an input/output interface and the like connected to each other through a bus, an FPGA (Field Programmable Gate Array), etc. A dedicated control circuit can be configured.

The controller 6 detects the start of irradiation of radiation with a predetermined detection format. That is, the controller 6 functions as the detecting unit according to the present invention. The specific method of detection is not limited, and the detection can be based on the signal from the radiation sensor (not shown) or the reader 5 or change in the current in a bias power supply 9B.

The storage 7 includes a SRAM (static RAM), a SDRAM (Synchronous DRAM), a NAND type flash memory, an HDD (Hard Disk Drive), and the like.

The communicator 8 communicates with external devices with a wireless or wired format through an antenna 81 or a connector 82.

The internal power source 9A includes a lithium ion battery, a lithium ion capacitor, or the like, and supplies power to the radiation detector 3, the scanning driver 4, etc.

When the power switch 11 is turned on in the radiation image capturing apparatus 20, the bias voltage is applied to the radiation detecting elements 34 through the connecting line 37 and the bias lines 36 from the bias power supply 9B. A reference voltage is applied to the signal lines through the reading circuit 5.

As shown in FIG. 4, the reset process is performed in which the on voltage is sequentially applied to the TFT 35 through the lines L1 to Lx of the scanning lines 32 from the scanning driver 4, and the bias voltage inverting the difference between the reference voltage applied to the signal line and the bias voltage applied to the bias line is applied to the radiation detecting element 34. When the reset process of the last line Lx ends, the reset process is repeated again from the first line L1.

While the reset process is repeated, when the irradiation of the radiation is detected, the reset process ends, the on voltage is not applied to the scanning lines in at least the regions used for the diagnostic image, and the process advances to the charge accumulating state. That is, the charge generated in the radiation detecting elements 34 by the irradiation of radiation is accumulated in the radiation detecting element 34.

When the irradiation of radiation ends, the readout process of the image data is performed. The on voltage is sequentially applied to the lines L1 to Lx of the scanning line 32 from the gate driver 42, and the charge accumulated in the radiation detecting element 34 is discharged to the signal line 33.

Then, the integrated circuit 51a of the reading circuit 51 integrates the charge discharged from the signal line 33 and outputs the voltage according to the amount of integrated charge. Then, the CDS circuit 51b outputs the image data with the analog value. The output image data is sequentially transmitted to the A/D converter 53 through the analog multiplexer 52. Then, the A/D converter 53 sequentially converts the output image data with the analog value to the image data with the digital value. The converted image data with the digital value is sequentially stored in the storage 7. With this, the readout process of the image data is performed.

<Environment Determination of Radiation Image Capturing Apparatus>

Figure 5:
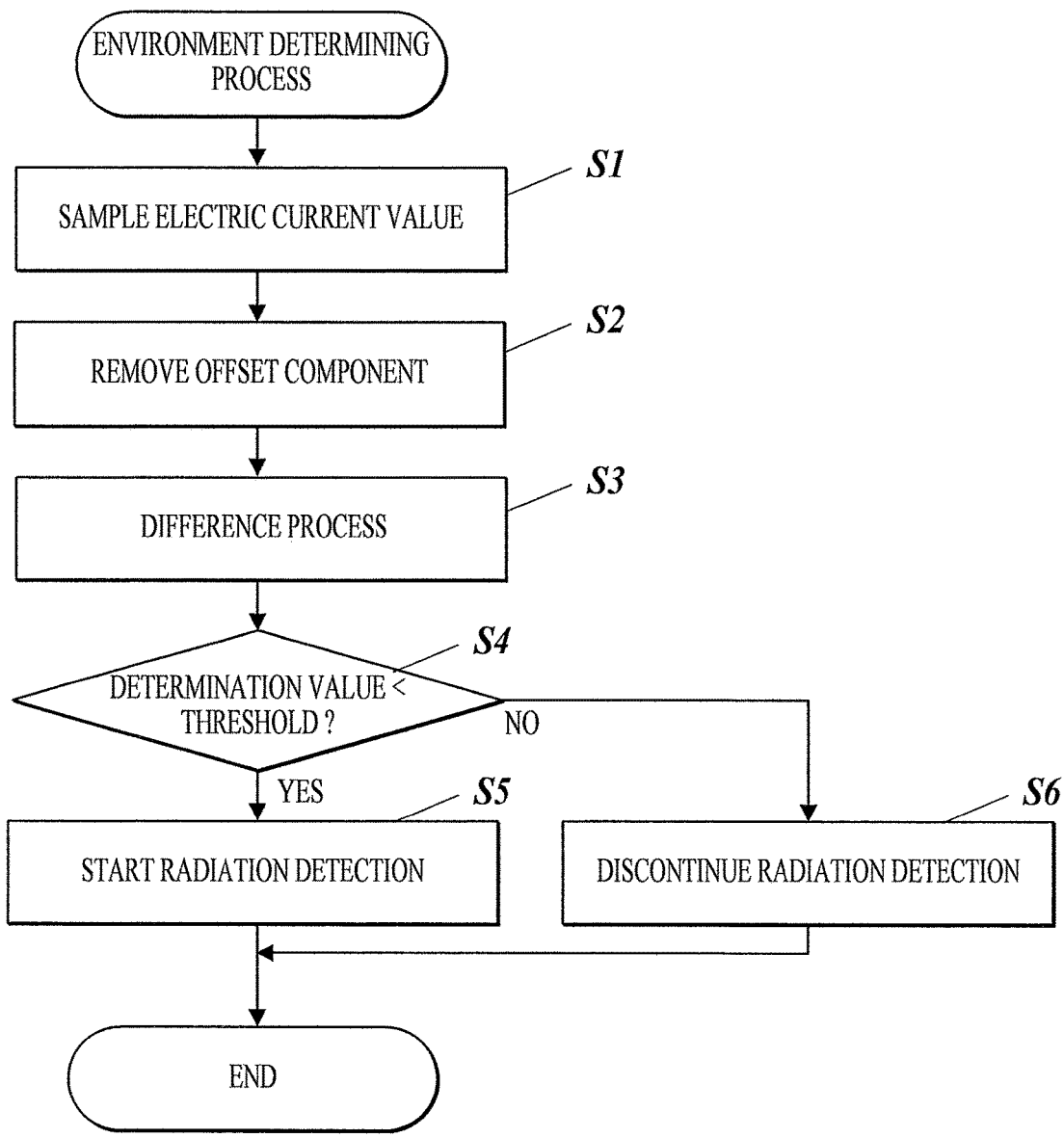
FIG. 5 is a flowchart of an environment determining process performed by the radiation image capturing apparatus shown in FIG. 1.

Next, the environment determination performed by the radiation image capturing apparatus 20 according to the present embodiment is described. FIG. 5 is a flowchart showing the environment determining process performed by the controller 6 of the radiation image capturing apparatus. FIG. 6 is a graph showing the temporal change of the sampled signal value and a graph showing the temporal change of the processed signal value obtained by performing a predetermined calculation on the signal value in the radiation image capturing apparatus 20 according to the present embodiment. The graphs described in the left vertical line in FIG. 6 (shown with a, d, g, j, m, and p) show a situation in a disturbance environment, the graphs described in the center vertical line (shown with b, e, h, k, n, q) show a situation not receiving irradiation of radiation in a state not in the disturbance environment, and the graphs described in the right vertical line (shown with c, f, i, l, o, r) show a situation receiving irradiation of radiation in a state not in the disturbance environment.

When the power of the radiation image capturing apparatus 20 according to the present embodiment is turned on and the operation of the scanning driver 4 starts, the controller 6 performs the environment determining process shown in FIG. 5.

Before describing the specific operation, the environment determination performed by the radiation image capturing apparatus 20 according to the present embodiment is described. Specifically, the sampling in which the signal based on the electric current combining the bias current detecting method which detects the irradiation of radiation by detecting the change in the current flowing in the bias line 36 is sampled a plurality of times to obtain the digital signal is described.

There is a method to configure an integrating circuit as a unit to detect the change in the current flowing in the bias line 36. The output voltage of the integrating circuit is converted in a span shorter than the scanning cycle (1 gate cycle) to a digital signal with the A/D converter (step S1).

In step S1, a process to remove noise is performed since the noise is overlapped by control. The noise is the electric current which flows through parasitic capacitance when the scanning line 32 (TFT 35) is turned on and off, and the noise is called a through current or field through.

The change in the electric current cannot be detected in the term when the integrating circuit of the bias current detecting circuit is reset, and the similar noise by the through current is overlapped at the start and end of reset. The data during the term while the noise is generated and the term when the change in the current cannot be detected cannot be used or a noise removal process is performed to rewrite to a reference value.

The calculation of the present invention may include a noise removal process.

Preferably, the switching between on and off of the scanning line 32 is controlled to overlap with the reset of the integrating circuit so that the term that the data cannot be used is made short.

Moreover, preferably, the switch to off of the scanning line 32 and on of the next scanning line 32 is performed at substantially the same time so that the noise is offset or the noise generating term is made shorter.

Next, the sampling in which the signal based on the electric current combined with the signal current detecting method which detects irradiation of radiation by detecting the change in the current flowing in the signal line 33 is sampled a plurality of times to obtain the digital signal is described.

Other than the operation to read charge from the radiation detecting element 34, the reading circuit 5 includes the functions described below.

The reading circuit 5 includes a selection switch (not shown) so that the output of the integrating circuit 51a is directly connected to the analog multiplexer 52. The function to pass without passing through the CDS circuit 51b is included.

The analog multiplexer 52 is controlled so that a certain signal line 33 is connected to the A/D converter 53.

The A/D converter 53 performs digital conversion a plurality of times within one scanning cycle and outputs the digital signal.

Here, a configuration not passing the CDS circuit 51b is described. The configuration is not limited to the above, and the output of the integrating circuit 51a can be sampled and held at the beginning of one scanning in the first sample hold circuit, and the voltage of the difference between the output voltage of the integrating circuit 51a and the voltage of the first sample hold can be output in the CDS 51b.

Before subtracting, the output voltage of the integrating circuit 51a can be sampled and held in the second sample hold circuit and the voltage showing the difference from the first sample hold voltage can be output.

The analog multiplexer 52 can be configured so that the plurality of integrating circuits 51a and the plurality of CDS circuits 51b are connected to the A/D converter 53, and the averaged voltage is input in the A/D converter.

In order to detect the change in the current flowing in the scanning line, a similar configuration is possible in a method to detect the scanning line current which detects the change of the current of the off voltage or the method which uses the X-ray sensor.

A plurality of environment determining units can be combined (bias electric current detecting method, signal line electric current detecting method, scanning line electric current detecting method, X-ray sensor). Preferably, the conversion cycles of the A/D convertors are set to different cycles when a plurality of environment determining units are used. Alternatively, a plurality of A/D convertors can be combined in the same environment determining unit and it is possible to control the conversion cycles of the A/D convertors to be different. Alternatively, in the signal electric current detecting method, the conversion cycle of the A/D convertor can be controlled to be different for each readout circuit 5. That is, according to the sampling theorem, the conversion cycle that can be easily detected is different depending on the frequency of the disturbance.

Next, the specific operation is described. In the environment determining process, first, the sampling process is performed (step S1). Specifically, sampling is performed a plurality of times (for example, about 70 times) within a period (predetermined term) of 1 scanning cycle (from when one scanning line is driven until the next scanning line is driven) and the signal is digitalized. With this, data showing the temporal change of the signal value in 1 scanning cycle is generated as shown in graphs a, b, or c in FIG. 6. That is, the controller 6 functions as the sampling unit in the present invention. In graphs a, b, or c in FIG. 6, in the term in which the signal values are substantially the same, the switch element connected parallel with the capacitance composing the integrator is turned on and reset, and in the other terms, the switch element is turned off, the reset is canceled and the state is in being integrated. The digitalized signal can be used in a separate occasion for radiation irradiation detection.

The switch element includes a transistor such as FET, etc., and on voltage and off voltage are applied to the gate electrode. FIG. 6 describes this as Gate ON, Gate OFF.

After the process in step S1, the offset component removal process is performed (step S2). Specifically, the offset component (signal sampling in the state in which radiation is not irradiated and the disturbance such as electromagnetic waves is not input) obtained in advance is subtracted from the generated data (predetermined calculation is performed). With this, processed data is generated as shown in graphs d, e, or f in FIG. 6. That is, the controller 6 includes the calculating unit of the present invention and the calculating unit includes the offset removing unit.

Considering the change in offset due to temperature, if the offset subtraction signal is obtained for each temperature level, the accuracy of the offset component removal is enhanced.

While the radiation is not irradiated and the capturing is being prepared, the sampling unit performs calculating processes such as low path filter calculating and moving average on the signal obtained in step S1 in the scanning number direction, and the signal with the noise such as the electromagnetic wave reduced can be the offset component. The scanning number direction shows the calculating process of a signal obtained in the timing 1 of the first scanning, and the signal obtained in the timing 1 of the second scanning.

Graphs d to r shown in FIG. 6 show only the signal value in the term of the Gate OFF. The signal values in the term of the Gate ON are substantially the same. If the offset component removal process is performed, the value becomes almost 0, and the difference depending on whether there is disturbance or radiation irradiation is small. According to the present embodiment, only the term of the Gate OFF is to be the target of calculation (noise removal process). However, the target of calculation is any term in 1 scanning cycle. The calculation can be performed using one scanning cycle entirely, or using a certain term set across the Gate ON term and the Gate OFF term.

After the process of step S2, the difference process is performed (step S3). Specifically, as shown in graphs g, h, or i in FIG. 6, the absolute value of each signal value composing the generated processed data is obtained, and this is accumulated as shown in graphs j, k, or l in FIG. 6 and the absolute value accumulating data is obtained. As shown in graphs m, n, or o in FIG. 6, the signal value of the obtained signal is accumulated without obtaining the absolute value and sign added accumulating data is obtained. The sign added accumulating data is subtracted from the absolute value accumulating data (perform predetermined calculation). With this, determining data as shown in the graphs p, q or r in FIG. 6 can be obtained. That is, the calculating unit of the present invention includes the subtracting unit.

According to step S3, instead of the value subtracting the sign added accumulating data from the absolute value data, only the minus value in the processed data may be extracted to invert the sign, and this value may be accumulated. Although subtracting calculation is not performed, the same result as the subtracting unit can be obtained. Therefore, the value is equivalent with the subtracting unit.

Comparing the graphs after subtraction, the signal value in only the graph p in 6 based on the data sampled in the disturbance environment is drastically increased, and the other graphs are generally flat.

After the process of step S3, the obtained determination data is compared with the predetermined threshold (determining threshold under disturbance environment) (step S4). The threshold is a value set to be not smaller than the value of electric noise under the non-disturbance environment and to be able to determine that it is under the disturbance environment.

Here, since the determining data is accumulated calculation, only the right edge signal value in graphs p, q, r in FIG. 6 needs to be judged whether the value is smaller than the threshold. When it is determined that the value is smaller than the threshold (when the data is graph q or r in FIG. 6, step S4; YES), the radiation image capturing apparatus 20 determines that the radiation image capturing apparatus 20 is not under the disturbance environment and starts the detection operation to detect the irradiation of radiation (step S5). As described above, the detection operation starts after confirming that the apparatus is not placed under the disturbance environment. That is, it is determined whether the apparatus is under the disturbance environment before determining the radiation is detected. Therefore, it is possible to prevent capturing under the disturbance environment by mistake, and the capturing failing.

In the process shown in step S4, when it is determined that the signal value is not smaller than the threshold (equal to or larger than the threshold) (when the data is graph p in FIG. 6, step S4; NO), the radiation image capturing apparatus 20 determines that the apparatus is under the disturbance environment and therefore discontinues detection operation (step S6). That is, the controller 6 includes the determining unit according to the present invention.

When the detection operation is discontinued, the user is notified that there is a disturbance source nearby. The method of notification includes changing the style that the indicator 13 provided in the case 1 emits light (color or style of flashing), transmitting a signal to the console 30 and displaying characters or images, or outputting sound. In such case, the indicator 13 functions as the notification unit of the present invention. When notification is made by characters, images, sounds, etc., in addition to simply notifying that the apparatus is under the disturbance environment, a notification can be made to the user to move the radiation image capturing apparatus 20 away from the disturbance environment.

According to the above, when the apparatus cannot capture or cannot operate normally due to the disturbance source, the user is able to easily understand the reason.

In addition to performing the environment determining process during non-linking capturing to detect irradiation of radiation, the environment determining process may be repeatedly performed every predetermined amount of time while the power of the radiation image capturing apparatus 20 is turned on. With this, it is possible to speedily notify to the user that the apparatus is under the disturbance environment.

Only the determining process in the detection operation may be discontinued to discontinue the detection operation to detect the irradiation of radiation. According to the above, since the environment determining process and the calculation of the detection operation can be performed in parallel, the delay in determining the start of the X-ray irradiation can be reduced, and is therefore preferable.

When it is determined that the apparatus is under the disturbance environment, the calculation of the detection operation can be initialized and the detection operation can be discontinued.

When the radiation detection operation is resumed, preferably, the signal value before the operation is discontinued is initialized to remove influence under the disturbance environment.

Preferably, instead of discontinuing the detection operation to detect the irradiation of radiation, the threshold (radiation detection threshold) of the determining process in the detection operation is changed based on the value obtained in the calculation of the environment determining process. The irradiation of radiation can be detected without error even under the disturbance environment. For example, the value based on the difference value subtracting the sign added accumulating data from the absolute value accumulating data (for example, multiplying a coefficient) is added to the radiation detecting threshold of the determining process in the detection operation, it is possible to prevent erroneous detection.

For example, as the detection operation to detect the irradiation of radiation, it is possible to use the sign added accumulating data, and when the value is equal to or more than a radiation detecting threshold, it is determined that the radiation is irradiated. The radiation detecting threshold can be changed based on the value obtained in the calculation of the environment determining process. By simply modifying the contents of the calculation process, the disturbance environment determining process and the detection operation to detect the irradiation of radiation can be achieved. With this, the functions can be added or removed, and the calculation process can be enhanced without changing the configuration of the hardware.

As described above, the radiation image capturing apparatus 20 according to the present embodiment includes a plurality of radiation detecting elements 34 which are positioned two dimensionally, TFT 35 (switch element) which holds charge in a radiation detecting element, a scanning line 32 which drives the TFT 35, a signal line 33 which is connected through the TFT 35, a bias line 36 connected to the radiation detecting element 34, a detecting unit which detects that radiation is irradiated, a reader which reads image data based on charge amount accumulated in a plurality of radiation detecting elements based on the detecting unit detecting irradiation of radiation, a sampling unit which samples the signal based on the current of at least one of the current flowing in the line of the signal line 33 a plurality of times to obtain the digital signal, the bias line 36, the scanning line 32 and the detecting unit within a predetermined term, a calculating unit which calculates the digital signal obtained by the sampling unit, and a determining unit which determines whether the apparatus is under the disturbance environment based on the result calculated by the calculating unit.

Electric current flows in the lines under the influence of radiation and disturbance (noise, etc.), but the characteristics are different between the radiation and the disturbance. Therefore, by generating data showing the temporal change of the signal value based on the electric current flowing in the lines, the apparatus is able to determine whether the apparatus is positioned under the disturbance environment or radiation is irradiated positioned under a non-disturbance environment.

As a result, it is possible to determine whether the apparatus is placed under the disturbance environment before erroneously detecting the disturbance as radiation.

According to the present embodiment, by combining the offset removal and the difference process, it is possible to determine whether the apparatus is under the disturbance environment more easily.

The signal line is a line conventionally provided in the radiation image capturing apparatus and is connected to the integrating circuit which detects the change of the electric current. Therefore, it is possible to determine whether the apparatus is under the disturbance environment without consuming further costs.

The threshold used while the detection operation is discontinued (threshold to determine that the apparatus is not under the disturbance environment) can be smaller than the threshold used while the detection operation is performed (threshold to determine whether the apparatus is under the disturbance environment).

According to the above, with hysteresis, it is possible to suppress chattering in which the determination of whether the apparatus is under the disturbance environment or not changes within a short period of time.

According to the present embodiment, the determination of whether the apparatus is under the disturbance environment and the determination of whether the start of irradiation is detected is performed within one scanning term. However, the signal value obtained in a plurality of scanning terms can be used for the determination. Specifically, the integrating calculation can be performed in the scanning number direction, calculation combining the integrating calculation and the HPF (high pass filter) calculation so that the DC component is not added and calculation of the movement average can be performed to determine that the apparatus is under the disturbance environment or the irradiation of radiation started.

(Modification)

The present invention is described above according to the embodiments, but the present invention is not limited to the above-described embodiments and modifications are possible without leaving the scope of the present invention.

Figure 7:
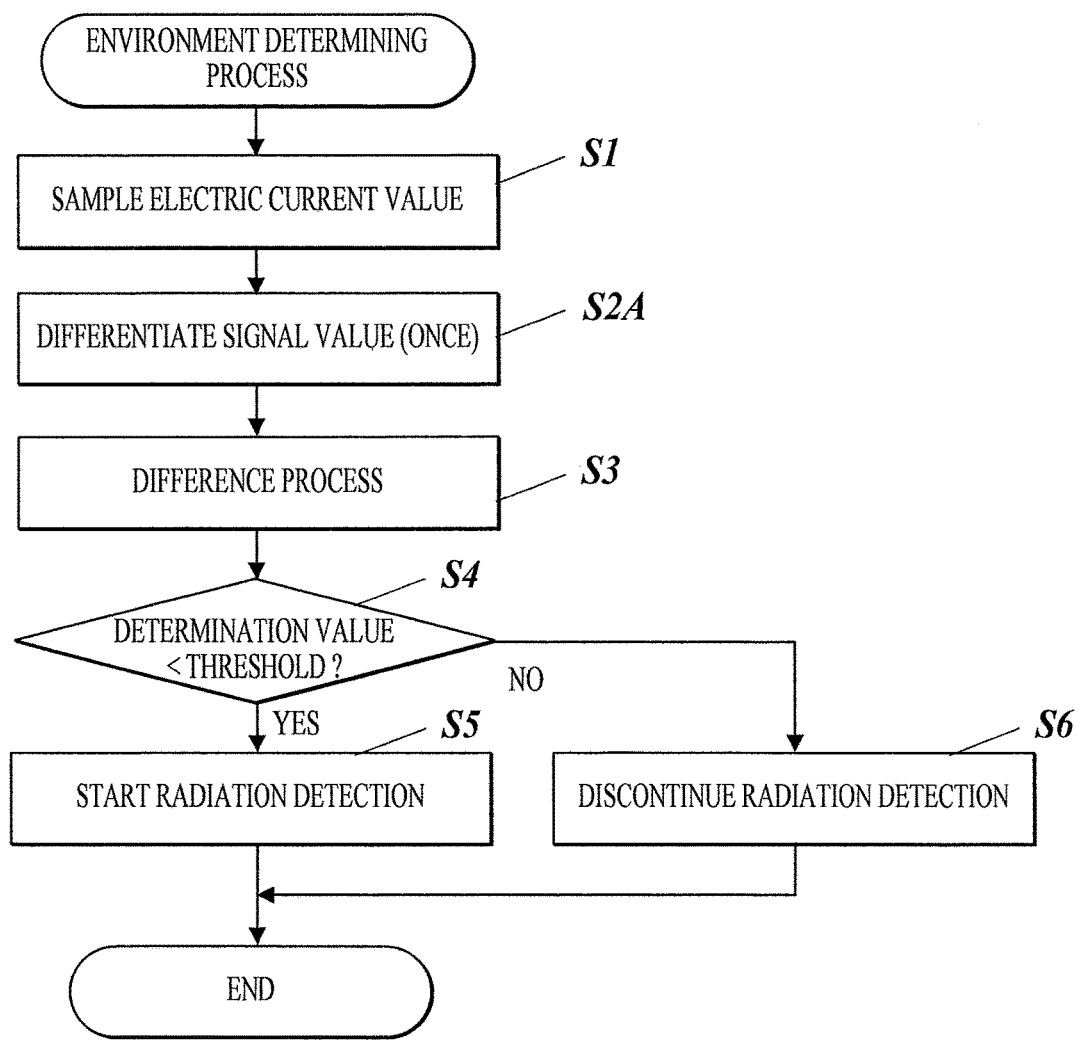
FIG. 7 is a flowchart showing the environment determining process which performs the radiation image capturing apparatus according to a modification of the present embodiment.

For example, according to the present embodiment, in the environment determining process, the process to remove the offset components from the digitalized signal value is performed but alternatively the differential calculating process can be performed (FIG. 7). For example, in the differential calculating process, the difference is calculated among the sampling intervals of the A/D conversion. The difference can be calculated among N times the sampling intervals, and it is possible to calculate among a plurality of 1 to N times the sampling intervals and to determine whether the apparatus is under the disturbance environment using the plurality of thresholds which correspond to each of the above. The conversion cycle that is easy to detect depends on the disturbance frequency due to sampling theorem. Since it is possible to make a state in which the sampling cycle is changed, different conversion cycles are covered and such situation is preferable.

Figure 8:
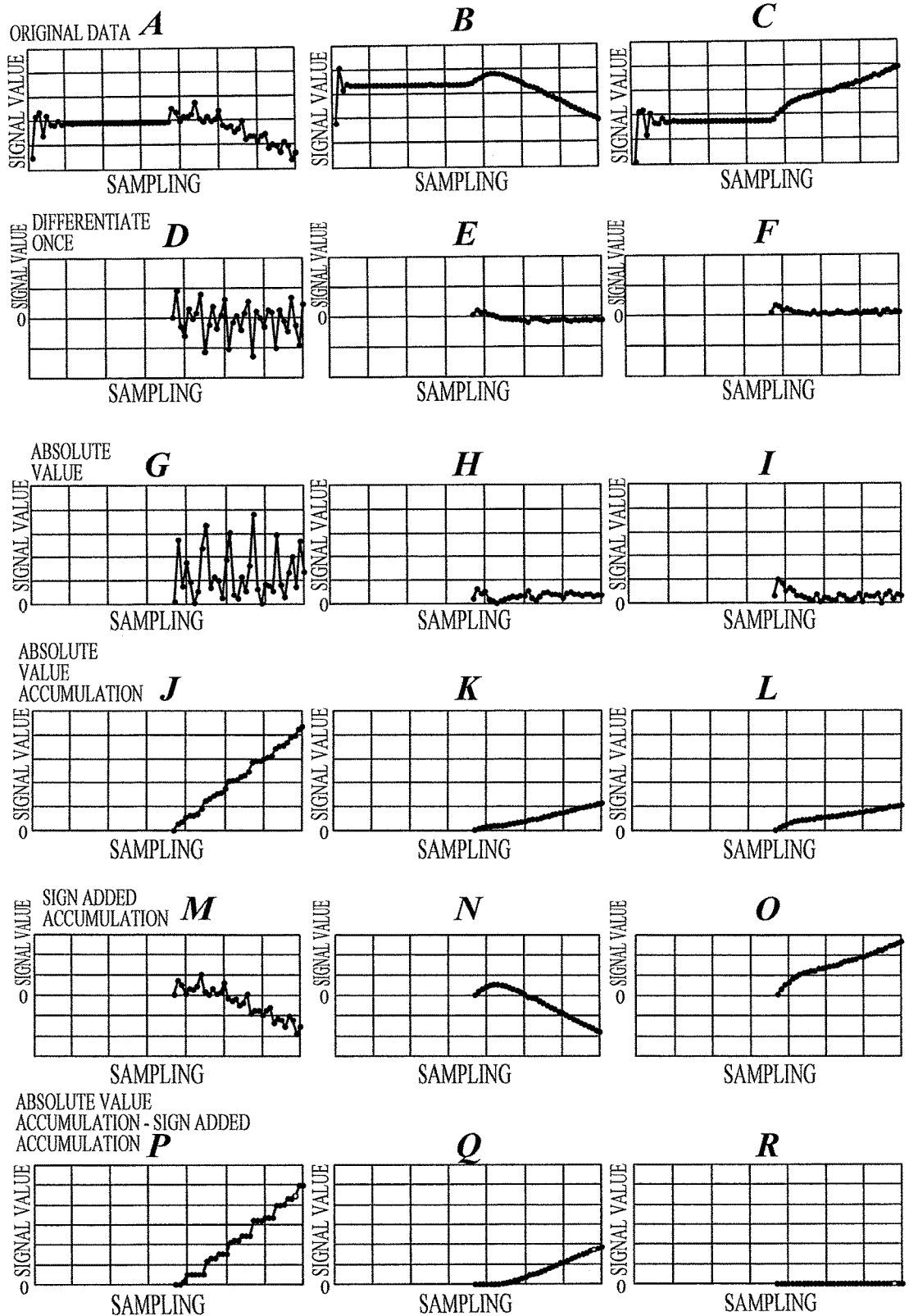
FIG. 8 is a graph of data showing temporal change of the sampled signal value and a graph showing processed data generated by the radiation image capturing apparatus of the modification from the above data.

Specifically, after the process of step S1, the digitalized signal value (graphs a, b, or c in FIG. 8) is differentiated once (predetermined calculating is performed, step S2A). Then, the processed data shown in graphs d, e, f in FIG. 8 is obtained. That is, the controller 6 in the modification functions as the differentiating unit in the present invention. Then, after the process in step S2A, the process similar to the process after step S3 according to the above embodiment is performed.

The process of step S2 according to the above embodiment (removing the offset component of the digitalized signal) is performed between the process of steps S1 and S2A.

Figure 9:
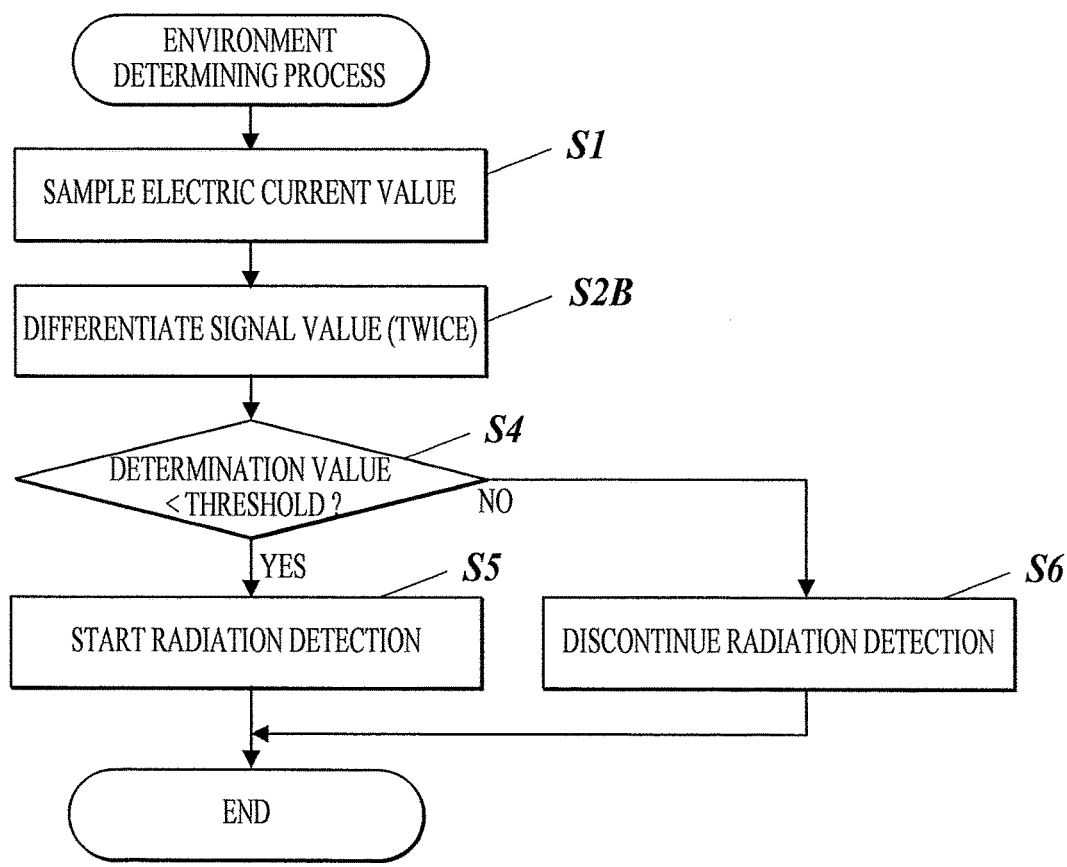
FIG. 9 is a flowchart of the environment determining process performed by the radiation image capturing apparatus according to a modification of the present embodiment.

The environment determining process can be performed as shown in FIG. 9.

Specifically, after the process in step S1, the digitalized signal value (graphs a, b, or c in FIG. 10) is differentiated once, and the obtained signal value (graph d, e, or f in FIG. 10) is further differentiated (step S2B). Then, graphs g, h, or i in FIG. 10 can be obtained. That is, the controller 6 according to the modification functions as the differentiating unit of the present invention. Then, after the process in step S2B, the process similar to the process after step S4 according to the above embodiment is performed.

Figure 10:
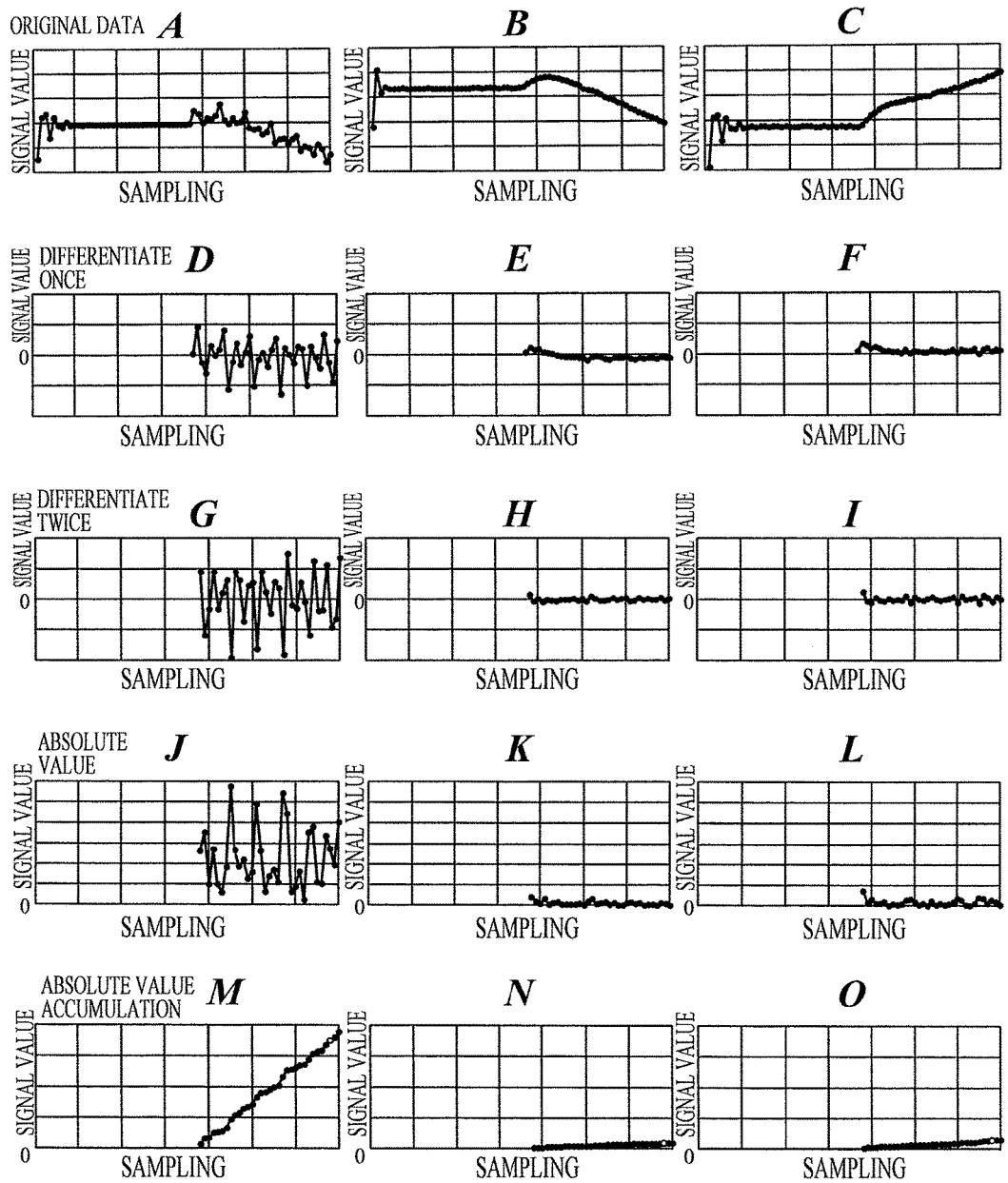
FIG. 10 is a graph of data showing temporal change of the sampled signal value and a graph showing processed data generated by the radiation image capturing apparatus of the modification from the above data.

As shown in FIG. 10, when differentiated twice, even in the state of adding the absolute value to the signal value, the difference of the signal value depending on whether or not there is disturbance becomes large, and it is possible to easily determine whether there is disturbance without performing the process of step S3.

The process of step S3 can be performed as necessary.

Similarly, the plurality of calculating processes with different sampling intervals in differentiating can be performed, and the threshold corresponding to each can be used to determine whether the apparatus is under the disturbance environment.

According to the above embodiment, the reader 5 is used to repeatedly extract the value of the current flowing in the signal line 33 and digitalizing the obtained plurality of signal values and the data showing the temporal change of the signal line is generated. In addition to the scanning lines 32 and the bias lines 36, since the electric current flows in the line composing the radiation detector 3 when the radiation is irradiated or when placed under the disturbance environment, a configuration which extracts and digitalizes the signal value based on the electric current value can be provided in the scanning lines 32 and the bias lines 36, and the data can be generated from the electric current flowing in these units.

According to methods to detect change in the current in the bias line 36, and the method to detect the change in the current in the signal line 33, the bias lines can be positioned in a double cross shape to offset the disturbance noise current generated in the substrate 31. With this, erroneous detection hardly occurs even under the disturbance environment, and the influence to the image decreases. Therefore, it is possible to obtain the radiation diagnostic image under the disturbance environment without erroneous detection. Further, the disturbance noise current is reduced by providing the bias line on the entire surface. Therefore, by combining the double cross shape and the plane (covered) shape on the entire surface to provide the bias line on the substrate 31, it is possible to obtain the radiation under the disturbance environment without erroneous detection.

<Configuration of Radiation Image Capturing System>

Figure 11:
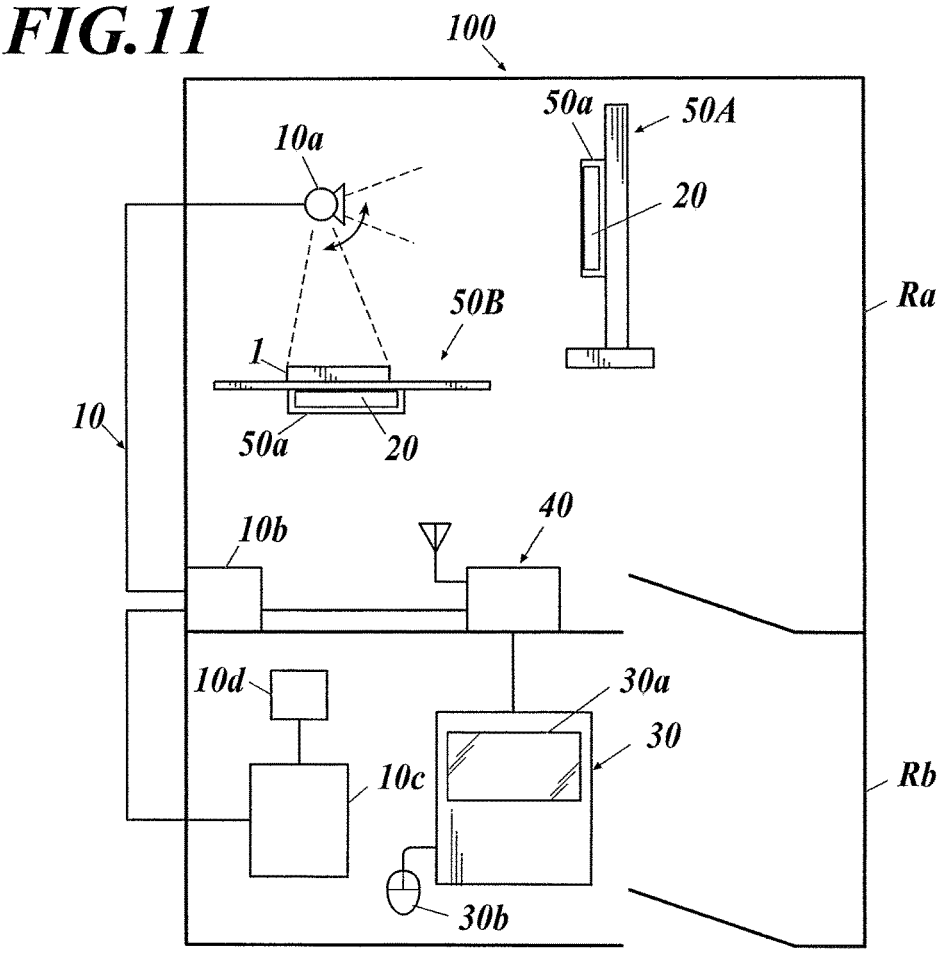
FIG. 11 is a schematic diagram showing a radiation image capturing system including the radiation image capturing apparatus shown in FIG. 1 provided in a building.
Figure 12:
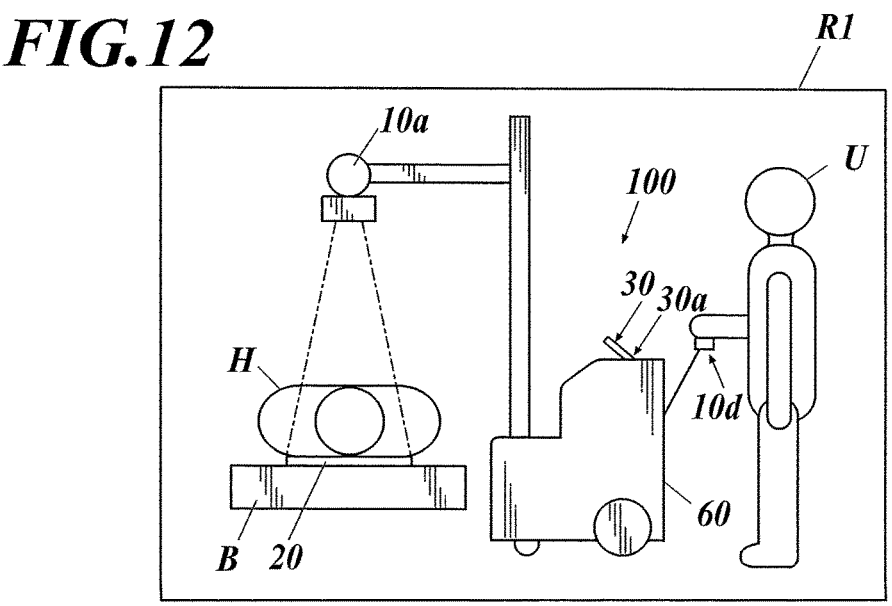
FIG. 12 is a schematic diagram showing a radiation image capturing system including the radiation image capturing apparatus shown in FIG. 1 used in combination with a diagnosis car.

Next, the configuration of a radiation image capturing system 100 using the radiation image capturing apparatus 20 is described. FIG. 11 and FIG. 12 are schematic drawings of the radiation image capturing system 100.

As shown in FIG. 11, the radiation image capturing system 100 according to the present embodiment includes a radiation irradiating apparatus 10, a radiation image capturing apparatus 20, a console 30, a relay 40, and the like.

The radiation image capturing system 100 is connected to a radiation information system (RIS), a picture archiving and communication system (PACS) or the like as necessary (all not shown).

The radiation irradiating apparatus 10 includes a radiation source 10a, a generator 10b, and an operating table 10c.

The radiation source 10a includes a rotating anode (not shown) which is able to generate radiation and a filament which irradiates an electron beam on the rotating anode.

The generator 10b controls the radiation source 10a so that the radiation is irradiated in the amount according to the set tubular voltage, tubular current and irradiating time (mAs value).

The operating table 10c includes an emitting switch 10d which the user such as the radiation technician is able to operate. Then, according to operation of the emitting switch 10d, the operating table 10c instructs the start of irradiation of radiation to the generator 10b.

The radiation image capturing apparatus 20 is only a non-linking type which detects radiation is irradiated, and when the radiation is irradiated from the radiation irradiating apparatus 10, the image data is read and the image data is transmitted to the external devices (console 30, etc.).

The details of the radiation image capturing apparatus 20 are described below.

The console 30 is composed of a computer or a dedicated apparatus, and includes a controller (not shown), a storage (not shown), a display 30a, an operating unit 30b, and the like.

The display 30a includes a CRT (Cathode Ray Tube), an LCD (Liquid Crystal Display), etc.

The operating unit 30b includes a mouse, a keyboard, a touch panel, and the like.

The relay 40 includes a function as an access point or hub to relay communication in a wireless format or a wired format between the radiation image capturing apparatus 20 and the console 30.

Alternatively, the radiation image capturing apparatus 20 and the console 30 can communicate with each other directly without the relay 40.

According to the radiation image capturing system 100, when the user operates the emitting switch 10d, the radiation irradiating apparatus 10 irradiates the radiation to the patient according to the conditions set on the operating table 10c. Then, the radiation image capturing apparatus 20 positioned behind the patient receives the radiation passing through the patient. Based on the radiation, the image data is read, and the read image data is transmitted to the console 30 through the relay 40.

As shown in FIG. 11, for example, the radiation image capturing system 100 according to the present embodiment can be combined with a fixed radiation irradiating apparatus 10 or can be combined with a diagnosis car 60 as shown in FIG. 12.

When the radiation image capturing system 100 is used indoors, for example, as shown in FIG. 11, the radiation source 10a and the generator 10b of the radiation irradiating apparatus 10, the radiation image capturing apparatus 20, and the relay 40 are positioned in the capturing room Ra, and the operating table 10c of the radiation irradiating apparatus 10 and the console 30 are positioned in the front room Rb (also called the operating room). Here, the radiation image capturing apparatus 20 can be configured to be mounted and used in the cassette holder 50a of the capturing stage (capturing stage 50A for capturing in a standing position and capturing stage 50B for capturing in a laying position). The relay 40 is positioned in the capturing room Ra and even if the console 30 is provided in the front room Rb, the wireless communication abilities can be maintained or a wired cable can be easily connected.

When the radiation image capturing system 100 is combined with the diagnosis car 60, as shown in FIG. 12, the configuration other than the radiation image capturing apparatus 20 is stored in the diagnosis car 60, and the radiation image capturing apparatus 20 can be transported. Then, when the radiation image capturing is performed using the diagnosis car 60, the radiation image capturing apparatus 20 can be inserted between the bed B and the patient H lying on the bed B, or the apparatus can be placed against the patient H. The radiation image capturing apparatus 20 and the console 30 can directly communicate with each other so that the relay 40 is not necessary. Alternatively, the radiation image capturing apparatus 20 and the console 30 can communicate with each other through the relay 40 (not shown).

The entire disclosure of Japanese Patent Application No. 2017-102548 filed on May 24, 2017 is incorporated herein by reference in its entirety.

What is claimed is:

1. A radiation image capturing apparatus comprising:
   a plurality of radiation detecting elements which are positioned two-dimensionally;
   a switch element which holds charge in the radiation detecting elements;
   a scanning line which drives the switch element;
   a signal line which is connected through the switch element;
   a bias line which is connected to the radiation detecting elements;

a hardware processor which detects that radiation is irradiated; and a reader which reads image data based on detection of irradiation of radiation by the hardware processor, the image data being based on an amount of charge accumulated in the plurality of radiation detecting elements, wherein:

the hardware processor samples a signal a plurality of times, the signal being based on at least one of currents flowing in the signal line, the bias line, the scanning line, and a detector line within a predetermined term, and the hardware processor obtains a digital signal, the hardware processor calculates the obtained digital signal, and the hardware processor determines whether the radiation image capturing apparatus is under a disturbance environment based on a result of calculation, and the hardware processor starts a detection operation to detect the irradiation of the radiation after determining that the radiation image capturing apparatus is not placed under the disturbance environment.

2. The radiation image capturing apparatus according to claim 1, wherein the hardware processor performs calculation of differentiating the obtained digital signal at least once.

3. The radiation image capturing apparatus according to claim 1, wherein the hardware processor removes an offset component from the obtained digital signal.

4. The radiation image capturing apparatus according to claim 3, wherein the hardware processor performs calculation focusing on a sign on a result of a calculation of the digital signal or a result of removing the offset component from the digital signal.

5. The radiation image capturing apparatus according to claim 1, wherein the hardware processor is able to change a radiation detecting threshold to determine whether the radiation is irradiated according to the calculated result.

6. The radiation image capturing apparatus according to claim 1, wherein:

the hardware processor compares a signal value of a calculated result with a predetermined threshold for each predetermined term, the hardware processor discontinues the detection operation when it is determined that at least some of the signal values are equal to or more than the threshold while the detection operation is performed, the hardware processor resumes the detection operation when it is determined that all of the signal values are less than the threshold while the detection operation is discontinued.

7. The radiation image capturing apparatus according to claim 6, wherein the threshold used for comparison with the signal value during the detection operation is larger than the threshold used for comparison with the signal value during the discontinuation of the detection operation.

8. The radiation image capturing apparatus according to claim 1, wherein the hardware processor notifies the user that there is a disturbance source nearby when it is determined that the radiation image capturing apparatus is placed under the disturbance environment.

9. A radiation image capturing system comprising:

the radiation image capturing apparatus according to claim 1; and a radiation irradiating apparatus which irradiates radiation to the radiation image capturing apparatus.

10. The radiation image capturing apparatus according to claim 1, wherein the disturbance environment is due to electromagnetic radiation.

11. A radiation image capturing apparatus comprising:

a plurality of radiation detecting elements which are positioned two-dimensionally;

a switch element which holds charge in the radiation detecting elements;

a scanning line which drives the switch element;

a signal line which is connected through the switch element;

a bias line which is connected to the radiation detecting elements;

a hardware processor which detects that radiation is irradiated; and a reader which reads image data based on detection of irradiation of radiation by the hardware processor, the image data being based on an amount of charge accumulated in the plurality of radiation detecting elements, wherein:

the hardware processor samples a signal a plurality of times, the signal being based on at least one of currents flowing in the signal line, the bias line, the scanning line, and the detector line within a predetermined term, and the hardware processor obtains a digital signal, the hardware processor calculates the obtained digital signal, the hardware processor determines whether the radiation image capturing apparatus is under a disturbance environment based on a result of calculation, the hardware processor performs the detection operation and determines, in parallel, whether the radiation image capturing apparatus is placed under the disturbance environment, and the hardware processor discontinues the detection operation when it is determined that the radiation image capturing apparatus is under the disturbance environment while the detection operation is performed.

12. The radiation image capturing apparatus according to claim 11, wherein the hardware processor performs calculation of differentiating the obtained digital signal at least once.

13. The radiation image capturing apparatus according to claim 11, wherein the hardware processor removes an offset component from the obtained digital signal.

14. The radiation image capturing apparatus according to claim 13, wherein the hardware processor performs calculation focusing on a sign on a result of a calculation of the digital signal or a result of removing the offset component from the digital signal.

15. The radiation image capturing apparatus according to claim 11, wherein the hardware processor is able to change a radiation detecting threshold to determine whether the radiation is irradiated according to the calculated result.

16. The radiation image capturing apparatus according to claim 11, wherein:

the hardware processor compares a signal value of a calculated result with a predetermined threshold for each predetermined term, the hardware processor discontinues the detection operation when it is determined that at least some of the signal values are equal to or more than the threshold while the detection operation is performed, the hardware processor resumes the detection operation when it is determined that all of the signal values are less than the threshold while the detection operation is discontinued.

17. The radiation image capturing apparatus according to claim 16, wherein the threshold used for comparison with the signal value during the detection operation is larger than the threshold used for comparison with the signal value during the discontinuation of the detection operation.

18. The radiation image capturing apparatus according to claim 11, wherein the hardware processor notifies the user that there is a disturbance source nearby when it is determined that the radiation image capturing apparatus is placed under the disturbance environment.

19. A radiation image capturing system comprising:
the radiation image capturing apparatus according to claim 11; and
a radiation irradiating apparatus which irradiates radiation to the radiation image capturing apparatus.

20. The radiation image capturing apparatus according to claim 11, wherein the disturbance environment is due to electromagnetic radiation.

* * * * *